United States Patent
Ghoneim et al.

(10) Patent No.: US 8,494,719 B2
(45) Date of Patent: Jul. 23, 2013

(54) METHOD AND APPARATUS FOR CONTROLLING ACTIVE REAR STEERING

(75) Inventors: Youssef A. Ghoneim, Oakland Township, MI (US); Ross Feller, Palo Alto, CA (US); Kevin A. O'Dea, Ann Arbor, MI (US); Edward J Argalas, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/702,652

(22) Filed: Feb. 9, 2010

(65) Prior Publication Data

US 2012/0065842 A1 Mar. 15, 2012

Related U.S. Application Data

(60) Provisional application No. 61/151,946, filed on Feb. 12, 2009.

(51) Int. Cl.
*B62D 6/00* (2006.01)
*B62D 7/15* (2006.01)

(52) U.S. Cl.
CPC ............... *B62D 7/159* (2013.01); *B62D 6/002* (2013.01); *B62D 6/003* (2013.01)
USPC .............................................. 701/42; 701/41

(58) Field of Classification Search
USPC ................ 701/36, 41, 42; 188/408, 409, 410, 188/417, 443, 447
See application file for complete search history.

(56) References Cited

U.S. PATENT DOCUMENTS

| | | | | |
|---|---|---|---|---|
| 4,679,808 A * | 7/1987 | Ito et al. | | 180/408 |
| 4,720,790 A * | 1/1988 | Miki et al. | | 701/41 |
| 5,020,619 A * | 6/1991 | Kanazawa et al. | | 180/412 |
| 5,457,632 A * | 10/1995 | Tagawa et al. | | 701/43 |
| 5,606,502 A * | 2/1997 | Adachi et al. | | 701/36 |
| 6,122,577 A * | 9/2000 | Mergenthaler et al. | | 701/30.2 |
| 6,580,988 B2 * | 6/2003 | Lin et al. | | 701/41 |
| 7,540,351 B2 * | 6/2009 | Kataoka et al. | | 180/446 |
| 2009/0048735 A1 * | 2/2009 | Guegan | | 701/42 |

FOREIGN PATENT DOCUMENTS

| | | |
|---|---|---|
| DE | 4332040 | 3/1994 |
| EP | 0477820 | 12/1995 |
| EP | 2085293 | 5/2009 |

OTHER PUBLICATIONS

Ackermann et al., "Robust yaw damping of cars with front and rear wheel steering", IEEE Transactions on Control Systems Technology, vol. 1 No. 1, Mar. 1993, pp. 15-20.*
Matsumoto et al., "Vehicle lateral velocity and yaw rate control with two independent control inputs", American Control Conference, May 1990, pp. 1868-1875.*

* cited by examiner

*Primary Examiner* — James Trammell
*Assistant Examiner* — Todd Melton
(74) *Attorney, Agent, or Firm* — Parks IP Law LLC

(57) ABSTRACT

A controller of an active rear steering (ARS) control system includes a processor and a software module. The software module includes instructions that, when executed by the processor, cause the processor to determine rear steering angles, determine a vehicle state, determine shaping functions, and determine a rear steering command.

16 Claims, 3 Drawing Sheets

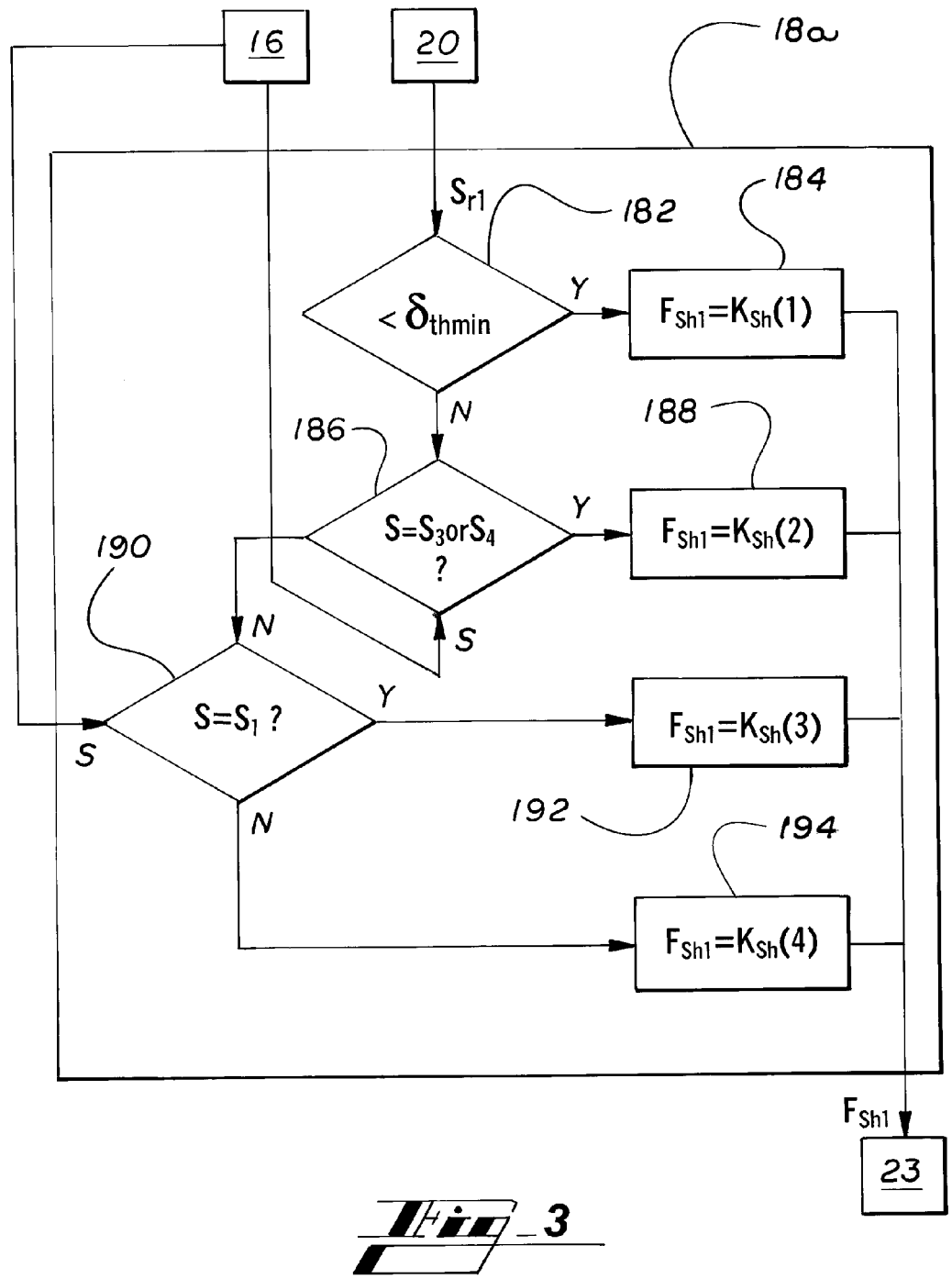
Fig_3

METHOD AND APPARATUS FOR CONTROLLING ACTIVE REAR STEERING

CROSS REFERENCE TO RELATED APPLICATIONS

This application claims priority to U.S. Provisional Application No. 61/151,946, filed Feb. 12, 2009, the entirety of which is incorporated herein by reference.

TECHNICAL FIELD

The technical field relates generally to control of an active rear steering (ARS) system of a vehicle.

BACKGROUND

Modern vehicles sometimes incorporate active vehicle control sub-systems. One such sub-system for providing automatic rear-wheel steering is known as an active rear steering (ARS) control system. The ARS control system corrects the operator steering command to cause the vehicle to more closely follow the vehicle operator's intended steering path while increasing vehicle stability and handling. However, under high speed conditions, some ARS control systems make steering corrections that deteriorate the overall performance of the vehicle.

SUMMARY

The various embodiments overcome the concerns of the prior art by providing an active rear steering (ARS) control system that is configured to control the angle of the rear wheels of a vehicle for various vehicle states including those that include high speed conditions. For example, vehicle state information is used to shape a rear steering angle command according to preferred turning characteristics for a vehicle operating at high speed.

According to an exemplary embodiment, an active rear steering control system for a vehicle includes a front steering angle sensor configured to measure a front steering angle of the vehicle, a yaw rate sensor configured to measure a yaw rate of the vehicle, a speed sensor configured to measure a speed of the vehicle, and a controller. The controller includes instructions that when executed by a processor cause the processor to determine a first rear steering angle as a function of the front steering angle; determine a second rear steering angle as a function of the yaw rate; determine a vehicle state as a function of at least one of the front steering angle, the yaw rate, and the speed; determine a first shaping function associated with the first rear steering angle as a function of the vehicle state; determine a second shaping function associated with the second rear steering angle as a function of vehicle state; and determine a rear steering command as a function of the first rear steering angle, the second rear steering angle, the first shaping function, and the second shaping function.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 3 is a flow chart illustrating a method of a software module of the active rear steering system of FIG. 1.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are know to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
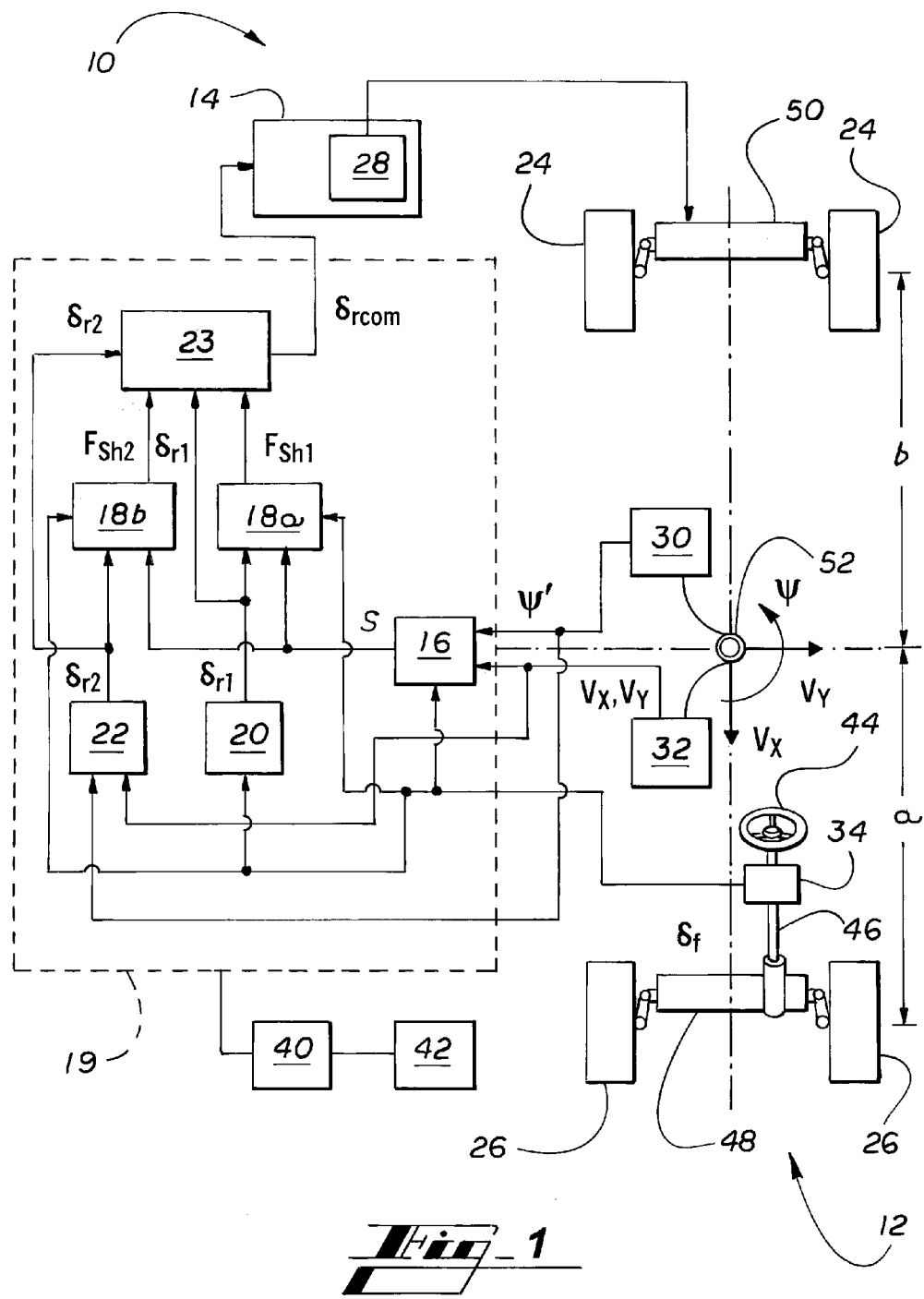
FIG. 1 is a schematic illustration of a vehicle including an active rear steering system, according to an exemplary embodiment.

Referring to FIG. 1, a vehicle 12 includes an active rear steering (ARS) control system 10, a steering wheel 44, a steering column 46, a front axle 48, front wheels 26, a rear axle 50, and rear wheels 24. The ARS control system 10 includes an ARS controller 19, a processor 40, a memory 42, and an ARS actuator 14. As used herein, the term "controller" refers to a computing device, such as but not limited to a programmable logic controller (PLC), remote terminal unit (RTU), or distributed control system (DCS), that monitors and affects the operational conditions of a given system. The ARS controller 19 includes software modules 16, 18a, 18b, 20, 22, 23 that include instructions that are executable by the processor 40. The illustrated ARS actuator 14 includes a motor 28 that is configured to steer the rear wheels 24 of the vehicle 12 according to a rear steering command $\delta_{rcom}$.

The ARS control system 10 includes a yaw rate sensor 30 configured to measure the yaw rate $\psi'$ of the vehicle 12, a speed sensor 32 configured to measure the longitudinal speed $V_x$ and lateral speed $V_y$ of the vehicle 12, and a steering angle sensor 34 configured to measure the front steering angle $\delta_f$ of the vehicle 12.

The state software module 16 is configured to determine the state S of the vehicle 12 as a function of the yaw rate $\psi'$, the vehicle speed $V_x$, and the front steering angle $\delta_f$. Steering angle software modules 20, 22 are configured to determine rear steering angles $\delta_{r1}$, $\delta_{r2}$ as a function of the yaw rate $\psi'$ and the front steering angle $\delta_f$. Shaping software modules 18a, 18b are configured to determine shaping functions $F_{sh1}$, $F_{sh2}$ as a function of the front steering angle $\delta_f$, the vehicle state S, and a respective one of the rear steering angles $\delta_{r1}$, $\delta_{r2}$. The combining software module 23 is configured to combine the rear steering angles $\delta_{r1}$, $\delta_{r2}$ with the shaping functions $F_{sh1}$, $F_{sh2}$ to generate the rear steering command $\delta_{rcom}$. The ARS actuator 14 is configured to steer and control the rear wheels 24 as a function of the rear steering command $\delta_{rcom}$. For example, the ARS actuator 14 generates a signal to drive the motor 28 using the rear steering command $\delta_{rcom}$.

The software modules 16, 18a, 18b, 20, 22, 23 are now described in further detail. The state software module 16 is configured to determine the vehicle state S. For purposes of teaching, various states S are defined as follows. A first state $S_1$ includes low speed $V_x$ and steady operation; a second state $S_2$ includes high speed $V_x$ and steady operation; a third state $S_3$ includes low speed $V_x$ and transient operation; and a fourth state $S_4$ includes high speed $V_x$ and transient operation. Steady operation and transient operation are defined for purposes of teaching by a front steering velocity threshold $\delta_{fth}'$, a minimum front steering velocity $\delta_{fthmin}'$, a yaw acceleration threshold $\psi_{th}''$, and a minimum yaw acceleration $\psi_{thmin}''$. For example, operation above both of the thresholds $\delta_{fth}'$, $\psi_{th}''$ is transient operation and operation below one or both thresholds $\delta_{fth}'$, $\psi_{th}''$ is steady operation. The minimums $\delta_{fthmin}'$, $\psi_{thmin}''$ are smaller than the thresholds $\delta_{fth}'$, $\psi_{th}''$ and are used to verify steady state over a time period or number of cycles. The thresholds $\delta_{fth}'$, $\psi_{th}''$ are and the minimums $\delta_{fthmin}'$, $\psi_{thmin}''$ are experimentally determined via testing vehicle 12. Similarly, high speed and low speed are defined by a threshold speed $V_{th}$. Above the threshold speed $V_{th}$ is high speed and below the threshold speed $V_{th}$ is low speed. For illustration, the threshold speed $V_{th}$ is 16 m/s.

Figure 2:
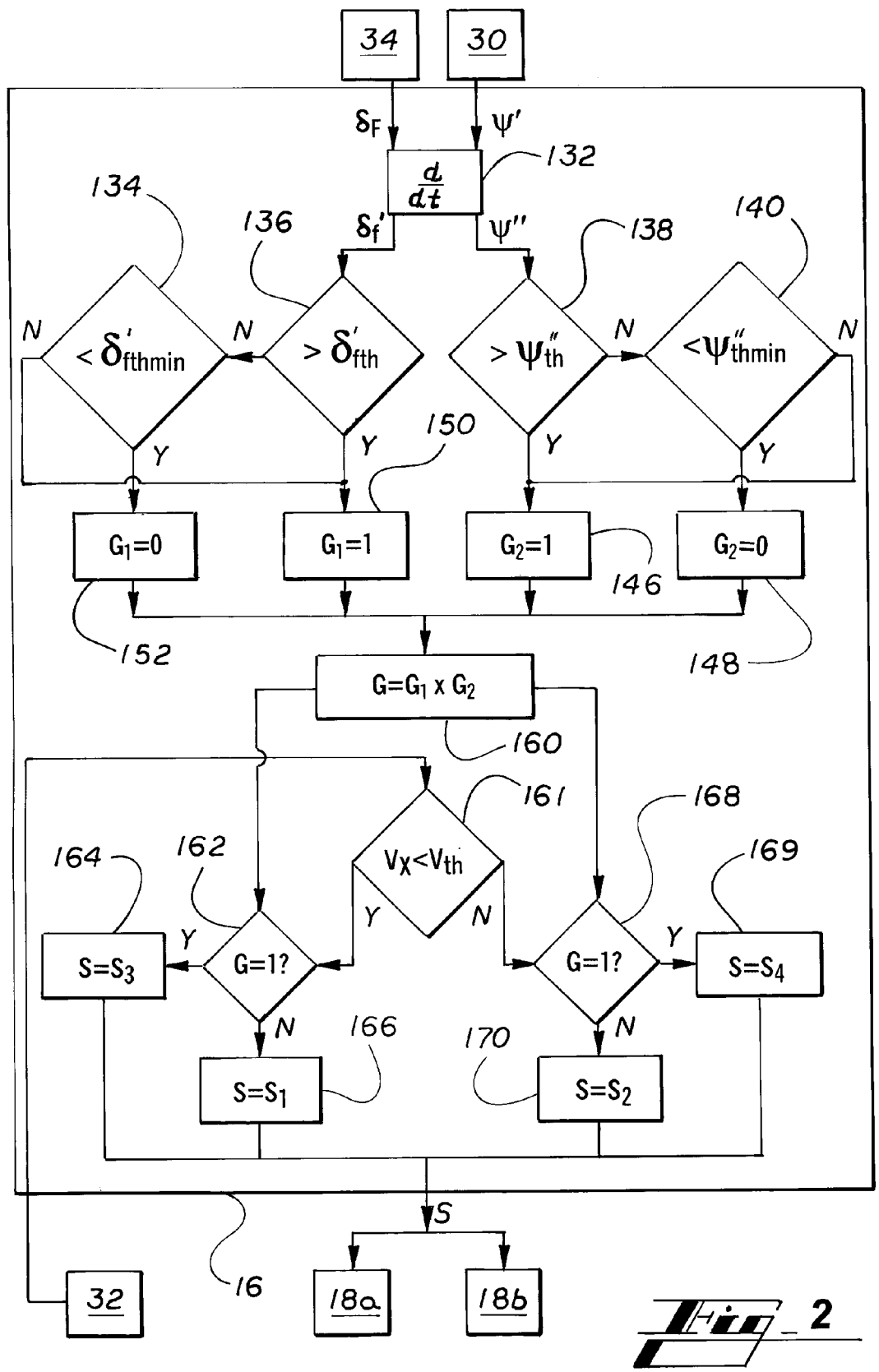
FIG. 2 is a flow chart illustrating a method of a software module of the active rear steering system of FIG. 1.

Referring to FIG. 2, an exemplary method of determining the vehicle state S is described. At a step 132, the state software module 16 calculates the derivative of the front steering angle $\delta_f$ and the yaw rate $\psi'$ to get a front steering velocity $\delta_f'$ and a yaw acceleration $\psi''$. At a step 136, the state software module 16 determines whether the steering angle velocity $\delta_f'$ is greater than the steering angle velocity threshold $\delta_{fth}'$. If yes, the state software module 16 sets a first flag $G_1$ to one at box 150. If not, at a step 134, the state software module 16 determines whether the steering angle velocity $\delta_f'$ is less than the minimum steering angle velocity $\delta_{fthmin}'$ for a certain amount of time (for example, 20 cycles with control cycle time of 10 msec, i.e. 200 msec). If yes, the state software module 16 sets the first flag $G_1$ to zero at box 152. If not, the state software module 16 sets the first flag $G_1$ to one at box 150.

At a step 138, the state software module 16 determines whether the yaw acceleration $\psi''$ is greater than the threshold yaw acceleration $\psi_{th}''$. If yes, then the state software module 16 sets a second flag $G_2$ to one at box 146. If no, at a step 140, the state software module 16 determines whether the yaw acceleration $\psi''$ is less than the minimum yaw acceleration $\psi_{thmin}''$ for a certain amount of time (for example, 20 cycles with control cycle time of 10 msec, i.e. 200 msec). If yes, then the state software module 16 sets the second flag $G_2$ to zero at box 148. If no, the state software module 16 sets the second flag $G_2$ to one at box 146. At a step 160, the state software module 16 determines a variable flag G by multiplying the first flag $G_1$ and the second flag $G_2$. Here, a variable flag G equal to one represents transient operation and a variable flag G equal to zero represents steady operation.

At a step 161, the state software module 16 determines whether the vehicle speed $V_x$ is less than the threshold speed $V_{th}$. If yes, at a step 162, the state software module 16 determines if the variable flag G is set to one. If no, the state software module 16 sets the vehicle state S to the first state $S_1$ at a box 166. If yes, the state software module 16 sets the vehicle state S to the third state $S_3$ at a box 164. If vehicle speed $V_x$ is not less than the threshold speed $V_{th}$ at step 161, at a step 168, the state software module 16 determines if the variable flag G is set to one. If no, the state software module 16 sets the vehicle state S to the second state $S_2$ at box 170. If yes, the state software module 16 sets the vehicle state S to the fourth state $S_4$ at box 169.

In alternative embodiments, the method includes alternative or additional vehicle states. The state can alternatively be represented by a continuous signal where the magnitude of the signal relative to a threshold indicates the state.

Exemplary steering angle software modules 20, 22 that are configured to determine the rear steering angles $\delta_{r1}$, $\delta_{r2}$ are now described in further detail. For purposes of teaching, a two degree-of-freedom model of yaw-plane dynamics is used. While the vehicle 12 is undergoing handling maneuvers, it not only incurs a yaw motion, but it also experiences a side-slip motion at the same time. The yaw motion is partially characterized by the yaw rate $\psi'$ and the lateral motion is partially characterized by the side slip or lateral velocity $V_y$. The vehicle yaw-plane dynamics are described by a second-order state equation:

$$\begin{bmatrix} V_y' \\ \psi'' \end{bmatrix} = \begin{bmatrix} \dfrac{-(C_f + C_r)}{mV_x} & \dfrac{b(C_r - aC_f)}{mV_x} - V_x \\ \dfrac{bC_r - aC_f}{IV_x} & -\dfrac{a^2 C_f + b^2 C_r}{IV_x} \end{bmatrix} \begin{bmatrix} V_y \\ \psi' \end{bmatrix} + \begin{bmatrix} \dfrac{C_f}{m} & \dfrac{C_r}{m} \\ \dfrac{aC_f}{I} & \dfrac{-bC_r}{I} \end{bmatrix} \begin{bmatrix} \delta_f \\ \delta_r \end{bmatrix}$$

where a is the distance from the center of gravity 52 of the vehicle 12 to the front axle 48; b is the distance from the center of gravity 52 of the vehicle 12 to the rear axle 50; $C_f$ is the cornering stiffness of both front wheels 26 of the front axle 48; $C_r$ is the cornering stiffness of both rear wheels 24 of the rear axle 50; I is the moment of inertia of the vehicle 12 about the yaw axis; m is the total vehicle mass; $V_x$ is the longitudinal speed of the vehicle's center of gravity; $V_y$ is the lateral speed of the vehicle's center of gravity 52; $\delta_f$ is the front steering angle of the front wheels 26; $\delta_r$ is the rear steering angle of the rear wheels 24; and $\psi'$ is the yaw rate of the vehicle 12. Experimentally determined parameters and parameters that are looked up are stored in the memory 42.

The rear steering angle $\delta_r$ can be determined as a function of the front steering angle $\delta_f$ and yaw rate $\psi'$ by setting both the lateral velocity $V_y$ and its derivative $V_y'$ to zero in the state equation to give:

$$0 = \left( \dfrac{bC_r - aC_f}{mV_x} - V_x \right) \psi' + \dfrac{C_f}{m} \delta_f + \dfrac{C_r}{m} \delta_r.$$

Solving for the rear steering angle $\delta_r$ gives:

$$\delta_r = -\dfrac{C_f}{C_r} \delta_f + \dfrac{1}{C_r} \left( \dfrac{aC_f - bC_r - mV_x^2}{V_x} \right) \psi'$$

The rear steering angle $\delta_r$ is the sum of the first rear steering angle $\delta_{r1}$ and the second rear steering angle $\delta_{r2}$. The first rear steering angle $\delta_{r1}$ is a function of the front steering angle $\delta_f$ and is given by:

$$\delta_{r1} = -\dfrac{C_f}{C_r} \delta_f$$

The second rear steering angle $\delta_{r2}$ signal is a function of the yaw rate $\psi'$ and the longitudinal speed $V_x$ and is given by:

$$\delta_{r2} = \frac{1}{C_r}\left(\frac{aC_f - bC_r - mV_x^2}{V_x}\right)\psi'.$$

In an alternative embodiment, the rear steering angles $\delta_{r1}$, $\delta_{r2}$ are determined based on different objectives such as subjective vehicle agility, vehicle turn circle reduction, or vehicle steering sensitivity modification as is understood by those familiar in the art.

The shaping software modules 18a, 18b are configured to determine shaping functions $F_{sh1}$, $F_{sh2}$. Referring to FIG. 3, an exemplary method of determining the first shaping function $F_{sh1}$ with the shaping software module 18a is now described. At a step 182, the shaping software module 18a determines if the first rear steering angle $\delta_{r1}$ is less than a rear steering angle threshold $\delta_{rthmin}$. If yes, the shaping software module 18a sets the first shaping function $F_{sh1}$ to a first shaping gain $K_{sh}(1)$ at box 184. If the first rear steering angle $Y_{r1}$ is not less than the rear steering angle threshold $\delta_{rthmin}$, at the step 182, at a step 186, the shaping software module 18a determines if the state S is the third state $S_3$ or the fourth state $S_4$. If yes, the shaping software module 18a sets the first shaping function $F_{sh1}$ to a second shaping gain $K_{sh}(2)$ at box 188. If the state S is not third state $S_3$ or fourth state $S_4$ at step 186, at a step 190, the shaping software module 18a determines if the state S is the first state $S_1$. If yes, the shaping software module 18a sets the first shaping function $F_{sh1}$ to a third shaping gain $K_{sh}(3)$ at box 192. If the state S is not one at step 190, the shaping software module 18a sets the first shaping function $F_{sh1}$ to a fourth shaping gain $K_{sh}(4)$ at box 194. The shaping software module 18b determines the second shaping function $F_{sh2}$ according to the same method.

The exemplary method of selecting a shaping gain $K_{sh}$ for the first shaping function $F_{sh1}$ takes into account the vehicle state S and a rear steering angle $\delta_{r1}$, $\delta_{r2}$. The exemplary shaping gains $K_{sh}$ are given by $$K_{sh}(\text{index}) = e^{Z(\text{index})} \text{ where}$$

$$Z(\text{index}) = Z_1(\text{index}) * Z_2(\text{index}),$$

$$Z_1(\text{index}) = \begin{cases} 0, & |\delta_f| < \delta_{fth} \\ K_{sh(rate)}, & |\delta_f| \geq \delta_{fth} \end{cases}, \text{ and}$$

$$Z_2(\text{index}) = \sum_{N=0}^{N_{th}} A(\text{index}) * N * T.$$

Here, T is the loop time (for example, 10 msec), N is loop number, $N_{th}$ is total number of loops, $\delta_{fth}$ is front steering angle threshold (for example, 5 degrees), and A and $K_{sh(rate)}$ are experimental values that are experimentally determined via vehicle testing. For example, for a set of indexed situations (index is [1 2 3 4]), A(index) is [1 1 0.01 0.02] and $K_{sh(rate)}$(index) is [0 0 −5 −10]. The loop number N is reset to zero when the front steering angle $\delta_f$ is less than the front steering angle threshold $\delta_{fth}$. Other suitable values for the shaping gains $K_{sh}$ can also be used, the shaping functions $F_{sh}$ can be selected according to alternative methods, and the specific implementation of the shaping functions $F_{sh}$ to determine the rear steering command $\delta_{rcom}$ can be modified according to alternate embodiments.

The combining software module 23 is configured to determine the rear steering command $\delta_{rcom}$ as a function of the shaping functions $F_{sh1}$, $F_{sh2}$ and the rear steering angles $\delta_{r1}$, $\delta_{r2}$. According to an exemplary embodiment, the combining software module 23 combines the shaping functions $F_{sh1}$, $F_{sh2}$ and the rear steering angles $\delta_{r1}$, $\delta_{r2}$ according to:

$$\delta_{rcom} = F_{sh1} * \delta_{r1} + F_{sh2} * \delta_{r2}.$$

According to an exemplary method of operation, referring to FIG. 1, the sensors 30, 32, 34 measure the yaw rate $\psi''$, vehicle speed $V_x$, $V_y$, and front steering angle $\delta_f$. The ARS controller 19 determines the rear steering command $\delta_{rcom}$ as described above. In sum, the state software module 16 determines the vehicle state S, the steering angle software modules 20, 22 determine rear steering angles $\delta_{r1}$, $\delta_{r2}$, the shaping software module 18a determine shaping functions $F_{sh1}$, $F_{sh2}$, and the combining software module 23 determines the rear steering command $\delta_{rcom}$. The ARS actuator 14 controls the motor 28 to steer the rear wheels 24 according to the rear steering command $\delta_{rcom}$.

The above-described embodiments merely illustrate implementations that are set forth for a clear understanding of principles. Variations, modifications, and combinations of the above-described embodiments may be made without departing from the scope of the claims. All such variations, modifications, and combinations are included herein by the scope of this disclosure and the following claims.

What is claimed is:

1. An active rear steering control system for a vehicle, comprising:
   a front steering angle sensor configured to measure a front steering angle of the vehicle;
   a yaw rate sensor configured to measure a yaw rate of the vehicle;
   a speed sensor configured to measure a speed of the vehicle; and
   a controller comprising instructions that, when executed by a processor, cause the processor to at least:
   calculate a first rear steering angle based on the front steering angle;
   calculate a second rear steering angle based on the yaw rate;
   select a marker indicative of a vehicle state, yielding a vehicle state marker, selecting the vehicle state marker including:
   comparing a steering angle velocity to a steering angle velocity threshold, comparing a yaw acceleration to a yaw acceleration threshold, and comparing vehicle speed to a speed threshold;
   wherein the steering angle velocity is the rate of change of the steering angle and the yaw acceleration is the rate of change of the yaw rate;
   select a first shaping function associated with the first rear steering angle based on the vehicle state marker and the first rear steering angle;
   select a second shaping function associated with the second rear steering angle based on the vehicle state marker and the second rear steering angle; and
   calculate a rear steering command based on the first rear steering angle, the second rear steering angle, the first shaping function, and the second shaping function.

2. The active rear steering control system of claim 1, wherein selecting the vehicle state marker comprises selecting from an enumerated list of vehicle state markers.

3. The active rear steering control system of claim 1, wherein selecting the vehicle state marker comprises determining a magnitude of a vehicle state signal.

4. The active rear steering control system of claim 1, wherein the calculation of the rear steering command includes a sum of:

the first rear steering angle multiplied by the first shaping function; and the second rear steering angle multiplied by the second shaping function.

5. The active rear steering control system of claim 4, wherein each of the first shaping function and the second shaping function is selected from a plurality of gains.

6. The active rear steering control system of claim 5, wherein the gains are calculated based on the front steering angle.

7. The active rear steering control system of claim 1, further comprising an actuator that is configured to control a rear steering angle of rear wheels of the vehicle according to the rear steering command.

8. The active rear steering control system of claim 1, wherein the first rear steering angle is further calculated based on a front wheel stiffness and a rear wheel stiffness.

9. The active rear steering control system of claim 1, wherein the second rear steering angle is further calculated based on the speed, a vehicle mass, a front wheel stiffness, a rear wheel stiffness, a distance from a front axle to a center of gravity of the vehicle, and a distance from a rear axle to the center of gravity.

10. The active rear steering control system of claim 1, wherein:

the first rear steering angle is based on the front steering angle and further includes:

$$\delta_{r1} = -\frac{C_f}{C_r}\delta_f;$$

where $\delta_{r1}$ is the rear steering angle, $\delta_f$ is the front steering angle, $C_f$ is a cornering stiffness of front wheels of a front axle, and $C_r$ is a cornering stiffness of rear wheels of a rear axle.

11. The active rear steering control system of claim 10, wherein:

the second rear steering angle is based on the yaw rate and a longitudinal speed and further includes:

$$\delta_{r2} = \frac{1}{C_r}\left(\frac{aC_f - bC_r - mV_x^2}{V_x}\right)\psi';$$

where $\delta_{r2}$ is the second rear steering angle, $\psi'$ is the yaw rate, a is the distance from a center of gravity of the vehicle to a front axle, b is the distance from the center of gravity of the vehicle to a rear axle; $C_f$ is the cornering stiffness of front wheels of the front axle, and $C_r$ is the cornering stiffness of rear wheels of the rear axle, m is a total vehicle mass, and $V_x$ is a longitudinal speed of the vehicle's center of gravity.

12. The active rear steering control system of claim 1, wherein the second rear steering angle is based on the yaw rate and a longitudinal speed and further includes:

$$\delta_{r2} = \frac{1}{C_r}\left(\frac{aC_f - bC_r - mV_x^2}{V_x}\right)\psi';$$

where $\delta_{r2}$ is the second rear steering angle, $\psi'$ is the yaw rate, a is the distance from a center of gravity of the vehicle to a front axle, b is the distance from the center of gravity of the vehicle to a rear axle; $C_f$ is a cornering stiffness of front wheels of the front axle, and $C_r$ is a cornering stiffness of rear wheels of the rear axle, m is a total vehicle mass, and $V_x$ is a longitudinal speed of the vehicle's center of gravity.

13. A controller of an active rear steering control system, comprising:

a processor; and at least one software module comprising instructions that, when executed by the processor, cause the processor to at least:

calculate a first rear steering angle based on a front steering angle measured by a steering angle sensor of the active rear steering control system;

calculate a second rear steering angle based on a yaw rate measured by a yaw rate sensor of the active rear steering control system;

select a marker indicative of a vehicle state, yielding a vehicle state marker;

select a first shaping function associated with the first rear steering angle based on the vehicle state marker and the first rear steering angle;

select a second shaping function associated with the second rear steering angle based on the vehicle state marker and the second rear steering angle; and calculate a rear steering command wherein the calculation of the rear steering angle includes a sum of:

the first rear steering angle multiplied by the first shaping function; and the second rear steering angle multiplied by the second shaping function.

14. The controller of claim 13, wherein the vehicle state is based on the front steering angle.

15. The controller of claim 13, wherein the vehicle state marker is based on the yaw rate.

16. The controller of an active rear steering control system of claim 13, wherein selecting the marker indicative of the vehicle state includes:

comparing a front steering angle velocity to a steering angle velocity threshold;

comparing a yaw acceleration to a yaw acceleration threshold; and comparing vehicle speed to a speed threshold;

wherein the steering angle velocity is a rate of change of the front steering angle and the yaw acceleration is a rate of change of the yaw rate.

* * * * *